W. H. SYMONS.
PROPORTIONAL FLUID METER.
APPLICATION FILED JAN. 10, 1912.

1,054,948.

Patented Mar. 4, 1913.

2 SHEETS—SHEET 1.

Witnesses:
S. J. Wells
Florence Williams

Inventor
William H. Symons.
by Clarence J. Williams
his Attorney

COLUMBIA PLANOGRAPH CO., WASHINGTON, D. C.

W. H. SYMONS.
PROPORTIONAL FLUID METER.
APPLICATION FILED JAN. 10, 1912.
1,054,948.
Patented Mar. 4, 1913.
2 SHEETS—SHEET 2.
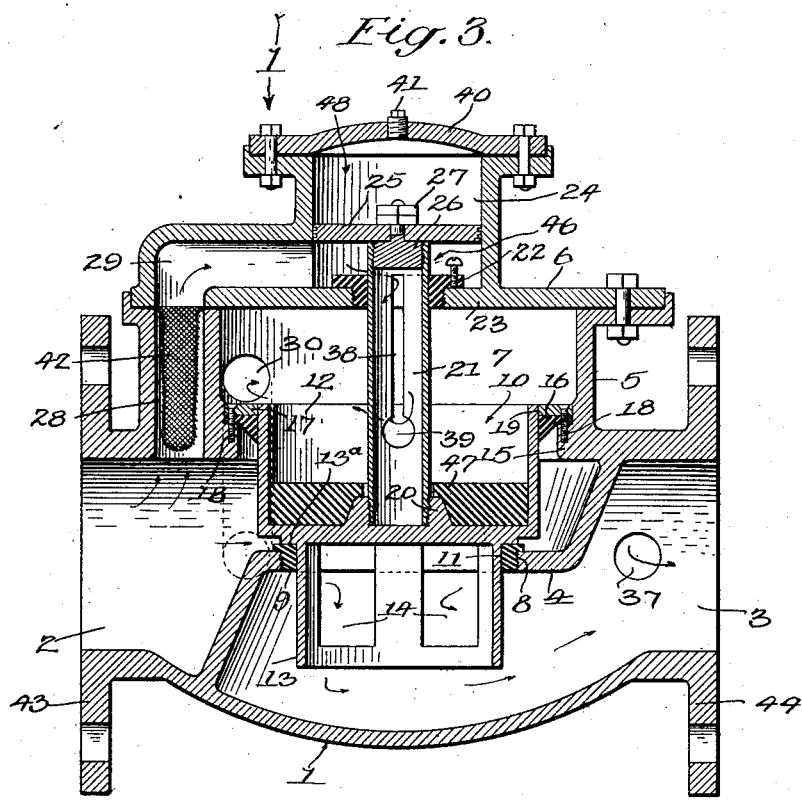
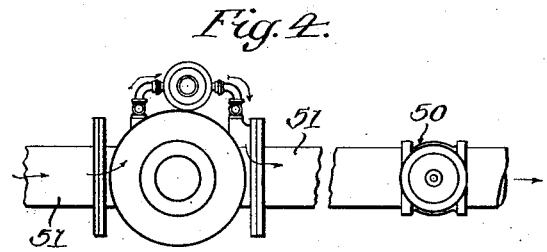
Witnesses:
S. G. Wells.
Florence Williams
Inventor
William H. Symons
by Clarence J. Williams
his Attorney.
COLUMBIA PLANOGRAPH CO., WASHINGTON, D. C.

UNITED STATES PATENT OFFICE.

WILLIAM H. SYMONS, OF SAN DIEGO, CALIFORNIA.

PROPORTIONAL FLUID-METER.

1,054,948.  Specification of Letters Patent.  Patented Mar. 4, 1913.

Application filed January 10, 1912. Serial No. 670,364.

*To all whom it may concern:*

Be it known that I, WILLIAM H. SYMONS, a citizen of the United States, residing at San Diego, in the county of San Diego and State of California, have invented a new and useful Proportional Fluid-Meter, of which the following is a specification.

My invention relates to the construction of valves, adapted to the measurement of liquids or gas, and is designed to separate liquids or gas into proportional streams, one stream to be measured by a meter geared to the proper speed to register the total quantity passed through the valves.

The primary object of this invention is to make a device which may be incorporated into a large main and indicate the aggregate flow through the main by actually measuring a certain proportion of the flow; and my invention consists of the novel features herein shown, described and claimed.

By the use of my proportional fluid meter the flow through the main is separated into a main large stream and a small metered stream, and means are provided for maintaining a fixed relative proportion between the two streams.

Another object is to provide a proportional valve with a by-pass and stop cocks in the by-pass, so that when one or both stop cock valves are shut off, the registration stops and also the flow of water without the liability of water hammer or sudden shocks due to rapidly closing valves.

Another object is to provide valves on both sides of the meter so that it may be removed without any waste of water.

The accompanying drawings illustrate the invention.

Figure 1:
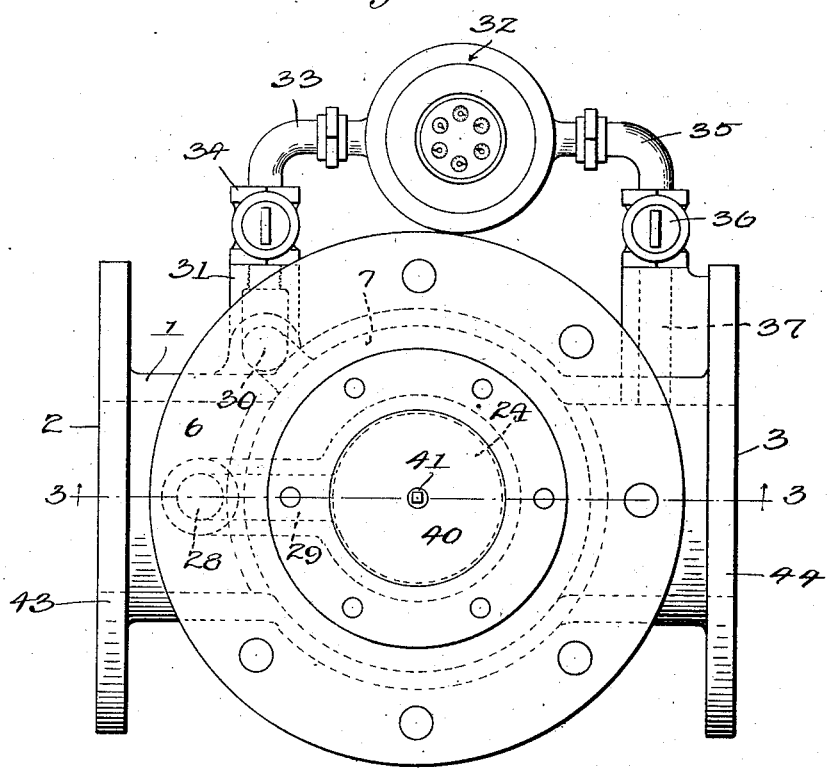
Figure 2:
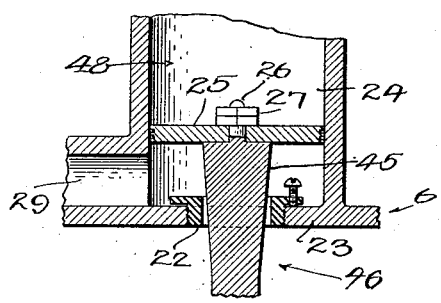

Figure 1 is a top plan view of the valve as it would appear looking in the direction of arrow 1 in Fig. 3. Fig. 2 is a modified form of inlet valve mechanism. Fig. 3 is a vertical axial section taken on the line 3—3 of Fig. 1. Fig. 4 is a diagrammatic plan view showing the valve in a line of pipe.

Referring to the drawings in detail, the valve casing 1 comprises a single casting provided with an inlet 2, and an outlet 3, separated by a diaphragm 4. An upwardly extending cylindrical casing 5 is formed integral with the valve casing 1, and a flanged cap 6, is bolted to the upper end of the cylindrical casing 5, thereby forming a pressure chamber 7. The diaphragm 4, is provided with a screw threaded opening 8, for the reception of a bushing 9, which is preferably formed of hard rubber, and a main valve 10 extends through an opening 11 in the bushing, said bushing forming a seat for said valve when it is closed. Said valve comprises a cylindrical portion 12 of a diameter, slightly less than that of the pressure chamber 7, and a downwardly extending cylindrical portion 13 of less diameter than the portion 12, thereby forming a shoulder 13ª which rests upon the bushing 9 and forms a tight joint when the valve is in a closed position as in Fig. 3, said portion 13 of the main valve 10 being provided with outlet openings 14. A shoulder or flange 15 is formed upon the inside of the pressure chamber 7 and a leather gasket 16 is held in place by a ring 17, secured to the shoulder 15 by screws 18. The upwardly extending portion 12 of the main valve 10 forms a sliding fit through the opening 19 of the ring 17, and the gasket 16.

A boss 20 is formed integral with the main valve 10 and tapped for the reception of a tube 21, said tube extending upwardly through a bushing 22 screw seated in the portion 23 of the cap 6, into a chamber 24 formed integral with the cap 6, a piston 25 is secured upon the upper end of the tube 21, by a screw threaded stud 26, and held in place by nuts 27, said piston forming a tight fit inside the chamber 24 and the whole thus forming a dash-pot.

A port 28 formed in casing 1 adjacent to the pressure chamber 7, leads from the inlet 2 upwardly and communicates with a port 29 formed in the cap 6, said port 29 leading into the chamber 24, and a port 30 leads from the pressure chamber 7 outwardly through a boss 31 formed upon the outside of the casing 1.

A meter 32 which is shown as a water meter in this case, is connected upon one side by pipe 33 and communicating with port 30 through stop cock 34 and upon the other side by pipe 35, stop cock 36 and port return 37.

Elongated slits 38 are formed in tube 21 and extend from the upper edge of the bushing 22 downwardly inside the portion 12 of the valve 10 and terminate in round openings 39. The bushing 22 may be adjusted up or down to regulate the volume of liquid admitted through the slits 38 by rotating the bushing to screw it up or down in the cap 6.

The cap plate 40 upon the chamber 24 is provided with a screw threaded plug 41 so that air pressure may be relieved when necessary.

A screen 42 is held in place in port 28 between the upper edge of the casing 5 and the cap 6, said screen preventing sediment from entering the meter.

Flanges 43 and 44 are formed upon the casing 1 and provided with boltholes for attachment to a line of pipe.

In Fig. 2 I have provided a modified form of inlet valve; instead of providing a tube with slits and openings therein, a tapered plug 45 is substituted.

The operation is as follows: When liquid is not flowing the pressure is the same in all parts of the valve casing 1, and valves 10 and 46 are held shut by gravity; so soon as pressure is relieved on outlet side (as by opening faucet 50 in the line 51) the pressure starts to drop in outlet 3, port 37, meter 32, port 30 and pressure chamber 7 while the pressure is maintained in chamber 24, ports 28 and 29 and inlet 2. The pressure on the outlet side continues to drop until there is sufficient difference of pressure in inlet 2 and chamber 7 to overcome the weight of valve 10 and weight 47 in cylinder 12, by virtue of the greater area of the cylinder 12, than the combined areas of the valve openings 10 and 38. When valves start to open water flows through openings 14 in valve 10 and valve 46 by way of slits 38 and on account of the shape of these slits, the quantity discharged by both valves will be proportional if they are fully open or nearly closed. Water entering at inlet 2 will pass through the valve 10 by way of slots 14 while a small percentage goes through valve 46 by way of slits 38 into chamber 7 thence into water way 30, meter 32 (thereby operating the meter), thence through water way 36 and into outlet 3.

Valve 10 may be weighted as indicated at 47 so that it will require a certain pressure to raise it and to insure closing by gravity when water stops flowing.

If either or both stop cocks 34 or 36 were closed, valve 10 would shut entirely as pressure in chamber 7 would accummulate until it became the same as in inlet 2, for the reason that water could enter valve 46 and could not get out. The closing of the valve would be slow owing to the dashpot 48. The operation of these valves depends on the variation of pressure in chamber 7 and as this is connected with outlet pipe 3 through port 30, valves 34 and 36 and meter 32, retarding the flow, would cause valves 10 and 46 to close enough to retard flow through both valves and raise pressure in inlet 2 or lower pressure in outlet 3 enough to overcome this resistance.

I claim:

1. In a proportional valve, a main casing, a diaphragm in the casing, a valve seat in the diaphragm, a main valve in opposition to the valve seat, a pressure chamber above the main valve, a by-pass communicating with said pressure chamber, and a meter in said by-pass and adapted to discharge below said diaphragm.

2. In a proportional valve, a main casing, a diaphragm in the main casing, a valve seat in the diaphragm, a main valve in opposition to the valve seat, a pressure chamber above the main valve, a piston chamber, a piston connected to the main valve and adapted to operate in said piston chamber, a by-pass leading from the pressure chamber, and a meter in said by-pass and discharging below the diaphragm.

3. In a proportional valve, a main casing having a passage therethrough, a diaphragm crossing the passage through the casing, and supporting a horizontal valve seat, a main valve in opposition to the valve seat, a pressure chamber above the main valve and having a by-pass, a piston chamber above the pressure chamber, a piston operating in the said piston chamber and connected to the main valve and controlling said by-pass, and a meter connected to the pressure chamber and discharging below the diaphragm.

4. In a proportional valve, a main casing having a passage therethrough, a diaphragm crossing the passage through the casing, and supporting a horizontal valve seat, a main valve in opposition to the valve seat, a pressure chamber above the main valve, a piston chamber above the pressure chamber, a piston in said chamber and connected with the main valve, means forming an inlet port to the piston chamber, means forming outlet ports from said piston chamber communicating with the pressure chamber, means forming a by-pass leading from the pressure chamber, and a meter in said by-pass and adapted to discharge below the diaphragm.

WILLIAM H. SYMONS.

Witnesses:
 JOHN Q. SYMONS,
 JOHN WOODLEY.

---

Copies of this patent may be obtained for five cents each, by addressing the "Commissioner of Patents, Washington, D. C."